(12) United States Patent
Bungo (10) Patent No.: US 7,940,388 B2
(45) Date of Patent: May 10, 2011

(54) SPECTROPHOTOMETER

(75) Inventor: Hajime Bungo, Muko (JP)

(73) Assignee: Shimadzu Corporation, Kyoto (JP)

( * ) Notice: Subject to any disclaimer, the term of this patent is extended or adjusted under 35 U.S.C. 154(b) by 350 days.

(21) Appl. No.: 12/332,967

(22) Filed: Dec. 11, 2008

(65) Prior Publication Data

US 2009/0153855 A1  Jun. 18, 2009

(30) Foreign Application Priority Data

Dec. 13, 2007  (JP) ................................. 2007-321604

(51) Int. Cl.
*G01J 3/42* (2006.01)
(52) U.S. Cl. ........................................ 356/319; 356/326
(58) Field of Classification Search .................. 356/319, 356/326
See application file for complete search history.

(56) References Cited

U.S. PATENT DOCUMENTS

| | | | | |
|---|---|---|---|---|
| 5,920,389 | A * | 7/1999 | Bungo | 356/325 |
| 6,795,180 | B2 * | 9/2004 | Bungo | 356/319 |
| 7,369,239 | B2 * | 5/2008 | Nagashima et al. | 356/405 |
| 7,511,255 | B2 * | 3/2009 | Fujita | 250/208.1 |

FOREIGN PATENT DOCUMENTS

| | | |
|---|---|---|
| JP | 05-045213 A | 2/1993 |
| JP | 07-209179 A | 8/1995 |
| JP | 08-247847 A | 9/1996 |
| JP | 2001-111783 A | 4/2001 |
| JP | 2002-197506 A | 7/2002 |
| JP | 2002-202189 A | 7/2002 |

* cited by examiner

*Primary Examiner* — L. G. Lauchman (74) *Attorney, Agent, or Firm* — Sughrue Mion, PLLC (57) ABSTRACT

When the apparatus is energized or a validation check is performed, a deuterium lamp 10 is turned on, and an output value resulting from an A/D conversion of the detection signal for light with a wavelength of 235 nm is obtained. A data processor 22 compares the output value with an upper limit value, which was determined and stored beforehand in a memory 24 (normally, in the manufacturing stage of the apparatus). If the output value is not less than the upper limit, a controller 25 operates an aperture driver 31 to reduce the light quantity by means of an adjustable aperture 30. This operation prevents an excessive quantity of light from reaching a photodetector 19, so that the measurement without absorption by a sample solution 18 can be correctly performed, and the absorbance by the sample solution 18 can be correctly calculated.

8 Claims, 5 Drawing Sheets

SPECTROPHOTOMETER

The present invention relates to a spectrophotometer, and more specifically to a spectrophotometer irradiating a sample with measurement light and analyzing the light that has undergone absorption by the sample. Such a spectrophotometer can be independently used, and are often employed as a detector for a liquid chromatograph.

BACKGROUND OF THE INVENTION

Figure 7:
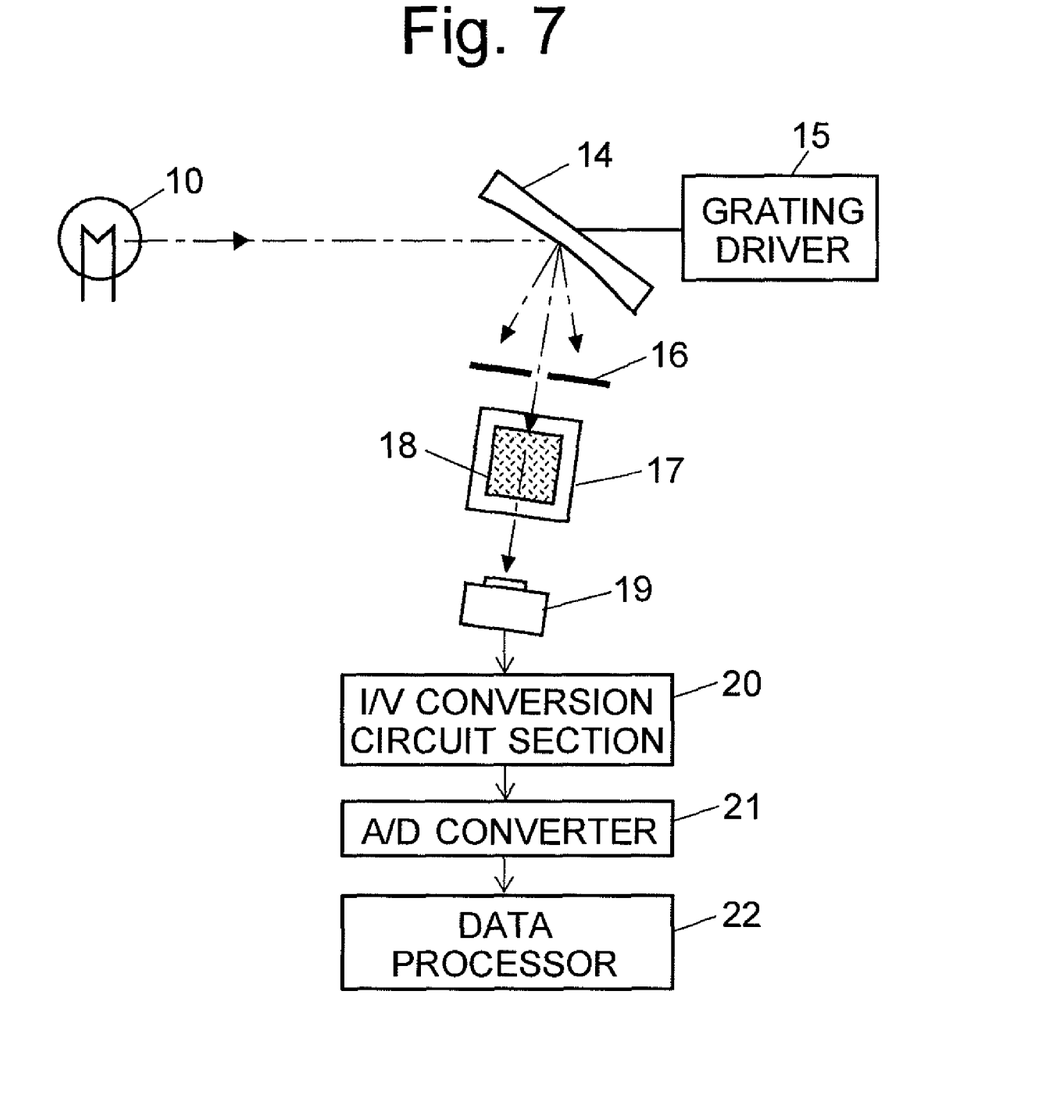
FIG. 7 is a schematic configuration diagram of an optical system of a conventional absorbance detector.

Absorbance detectors utilizing spectrophotometers are widely used as the detectors of liquid chromatographs. FIG. 7 is a schematic configuration diagram showing an optical system of a conventional absorbance detector disclosed in Japanese Unexamined Patent Application Publication No. 2002-202189 and other documents. A ray of light emitted from a deuterium lamp 10 (the light source) is directed onto a diffraction grating 14, which disperses the light over a range of wavelengths. From the light thus dispersed, a component of light with a specific wavelength is extracted through a slit 16 and delivered to a sample cell 17 containing a sample solution 18. For the light thus delivered, the intensity (or quantity) of light that has passed through the sample cell 17 is measured with a photodetector 19, such as a photodiode. An electric current thereby produced is converted into voltage signals by a current/voltage (I/V) conversion circuit section 20. These signals are further converted into digital data by an analogue/digital (A/D) converter 21 and sent to a data processor 22.

The absorption of light by the sample solution 18 causes the light quantity to be smaller than the value measured without absorption. The degree of attenuation depends on the concentrations of the components in the sample solution 18. Accordingly, it is possible to determine the quantities of the components in the sample solution by accurately determining the amount of absorbance, i.e. the magnitude of the change in the light quantity due to the presence of the sample solution 18. The wavelength of the measurement light (i.e. the light extracted through the slit 16 and delivered to the sample cell 17) depends on the angle of the diffraction grating 14, which can be rotated within a predetermined angular range by a grating driver 15 including a motor. Therefore, for example, it is possible to measure the intensity of the transmitted light while rotating the diffraction grating 14 in steps of small predetermined angles. The data obtained by this operation can be used to construct an absorption spectrum in the data processor 22.

The absorbance-based determination of the component quantities is premised on accurate measurements of the quantity of light both with absorption by the sample solution and without such absorption. However, the light-quantity data given to the data processor 22 may be affected by various factors as follows.

(1) Variation in the luminance of the deuterium lamp 10.
(2) Variation in the diffraction efficiency of the grating 14.
(3) Variation in the width of the slit 16.
(4) Variation in the size or transmittance of the light-transmission window of the sample cell 17.
(5) Variation in the photoelectric conversion efficiency of the photodetector 19.
(6) Variation in the conversion gain or other electrical characteristics in the I/V conversion circuit section 20.
(7) Read error of analogue signals in the A/D converter 21.

In view of these factors, the gain of the I/V conversion circuit section 20 in the conventional spectrophotometer is determined so that the light-quantity data (or the output of the A/D converter 21) measured without the absorption of light by the sample solution 18 will not saturate.

Among the various aforementioned factors, variations (3) to (7) are normally much lower than one percent, whereas the variations (1) and (2) can be as large as several tens of percent or more. This is due to the remarkable improvements in the luminous efficiency of deuterium lamps or the diffraction efficiency of gratings. Replacing the light source or diffraction grating in a user-owned absorbance detector with a new product having improved characteristics can result in a several tens of percent improvement in the light-quantity data obtained without absorption by the sample solution as compared to the data obtained before the part replacement.

In the worst-case scenario, the energy of light without absorption by the sample solution may exceed a previously estimated upper limit for the aforementioned reasons. If this situation occurs, the data processor 22 cannot correctly calculate the absorbance, so that it will provide inaccurate quantity-determination results. However, since there is no way of knowing the occurrence of the abnormal measurement, the user relying on the quantity-determination result provided by the data processor 22 will unintentionally prepare a wrong analysis report or provide the client with the unreliable measurement result.

The present invention has been developed to solve such a problem. Its first objective is to provide a spectrophotometer capable of detecting a situation in which the measurement cannot be correctly performed due to the replacement of the light source or diffraction grating or for other reasons, and then unmistakably informing a user of that situation to prevent the measurement from being incorrectly performed.

The second objective of the present invention is to provide a spectrophotometer capable of correctly calculating the absorbance even if the quantity of light reaching the photo detector exceptionally increases due to the replacement of the light source or diffraction grating or for other reasons.

SUMMARY OF THE INVENTION

To solve the aforementioned problems, the present invention provides a spectrophotometer including a light source for irradiating a sample with measurement light, a photodetector detecting light resulting from the sample being irradiated with the measurement light, a dispersing element located on an optical path between the light source and the sample or between the sample and the photodetector, and a processor dealing with a signal produced by the photodetector. The spectrophotometer further includes:

a memory section used for storing a threshold value previously determined on the basis of the upper limit of the signal level that can be processed by the processor;

a signal acquirer detecting, with the light source turned on, the value of either a detection signal produced by the photodetector or a signal fed to the processor at a wavelength where the signal intensity is maximized during the power-on process or validation check of the spectrophotometer; and an abnormality detector comparing the signal value acquired by the signal acquirer with the threshold value stored in the memory section and then determining that the operation is abnormal if the signal value exceeds the threshold value.

The processor may include a current/voltage conversion circuit converting an electric current produced by the photodetector into a voltage signal and an A/D converter converting the voltage signal into a digital value. In this case, the signal level that can be processed by the processor normally equals either the upper limit of the output of an operational amplifier in the current/voltage conversion circuit or that of the input of the A/D converter. Since variations of these values are far smaller than that of the quantity of the light generated by the light source or other values, the aforementioned threshold value can be uniquely specified in the manufacturing stage of the apparatus. For example, it is possible to experimentally determine the threshold value in the manufacturing stage and store it in the memory section, such as an electrically erasable and programmable read-only memory (EEPROM) or other non-volatile memory devices.

When the apparatus is energized before use, or when a validation check is performed, the signal acquirer turns on the light source and detects the value of either a detection signal produced by the photodetector or a signal fed to the processor at a wavelength where the signal intensity is maximized, without absorption by the sample. The "wavelength where the signal intensity is maximized" may be a wavelength that gives a signal value approximate to, but not equal to, the maximum value. If the signal value thus detected exceeds the threshold value, it is possible that the signal value is saturated due to an excessive quantity of light falling onto the photodetector. If this occurs, it is highly probable that the absorbance of light by the sample will not be correctly determined. In such a case, the abnormality detector determines that the operation is abnormal.

In one preferable mode of the spectrophotometer according to the present invention, the apparatus further includes an alarm system informing a user of an abnormality when the abnormality detector has determined that the operation is abnormal. The alarm information may be presented in a visual or audio form, or both. This information enables a person in charge of the analysis to recognize, before the analysis is actually performed, that the apparatus is not in the normal condition for correctly measuring the absorbance. Thus, the person can avoid performing the wasteful measurement. The alarm information also enables the person to figure out the cause of the abnormality (e.g. inappropriate replacement of the light source, grating or the like) and quickly take measures for a normal measurement.

It is further preferable to provide a regulation system for avoiding the operational abnormality when such an abnormality has been detected. Accordingly, in another mode of the present invention, the apparatus further includes a light-quantity regulator, located on the optical path from the light source to the photodetector, for reducing the quantity of light and a controller controlling the light-quantity regulator so that the aforementioned signal value will be equal to or less than the threshold value if the abnormality detector has determined that the operation is abnormal. The light-quantity regulator may be constructed using an aperture with a variable light-passing area, a set of filters with different optical transmittance, or other elements.

In another possible mode of the present invention, the apparatus includes a signal attenuator, located between the photodetector and the processor, for attenuating signals and a controller controlling the signal attenuator so that the signal value fed to the processor will be equal to or less than the threshold value if the abnormality detector has determined that the operation is abnormal. An example of the signal attenuator is an automatic gain control (AGC) amplifier.

The provision of such a mechanical or electrical regulation system eliminates the necessity of asking a service representative for tuning the apparatus to restore its normal condition for correctly measuring the absorbance when the light source has been replaced with a new one emitting a larger light quantity, or when the diffraction grating of the dispersion system has been replaced with a new one having a higher diffraction efficiency. Therefore, the total cost to the user is reduced, and the opportunity for the measurement is fully ensured.

EXPLANATION OF NUMERALS

10 . . . . Deuterium Lamp
11, 13 . . . . Driver
12 . . . . Low-Pressure Mercury Lamp
14 . . . . Diffraction Grating
15 . . . . Grating Driver
16 . . . . Slit
17 . . . . Sample Cell
18 . . . . Sample Solution
19 . . . . Photodetector
20 . . . I/V Conversion Circuit Section
21 . . . A/D Converter
22 . . . . Data Processor
23 . . . . Signal Value Determiner
24 . . . . Upper Limit Data Memory
25 . . . . Controller
26 . . . . Input Unit
27 . . . . Display Unit
30 . . . . Adjustable Aperture
30a, 30b . . . . Aperture Plate
31 . . . . Aperture Driver

DETAILED DESCRIPTION OF PREFERRED EMBODIMENTS

Figure 1:
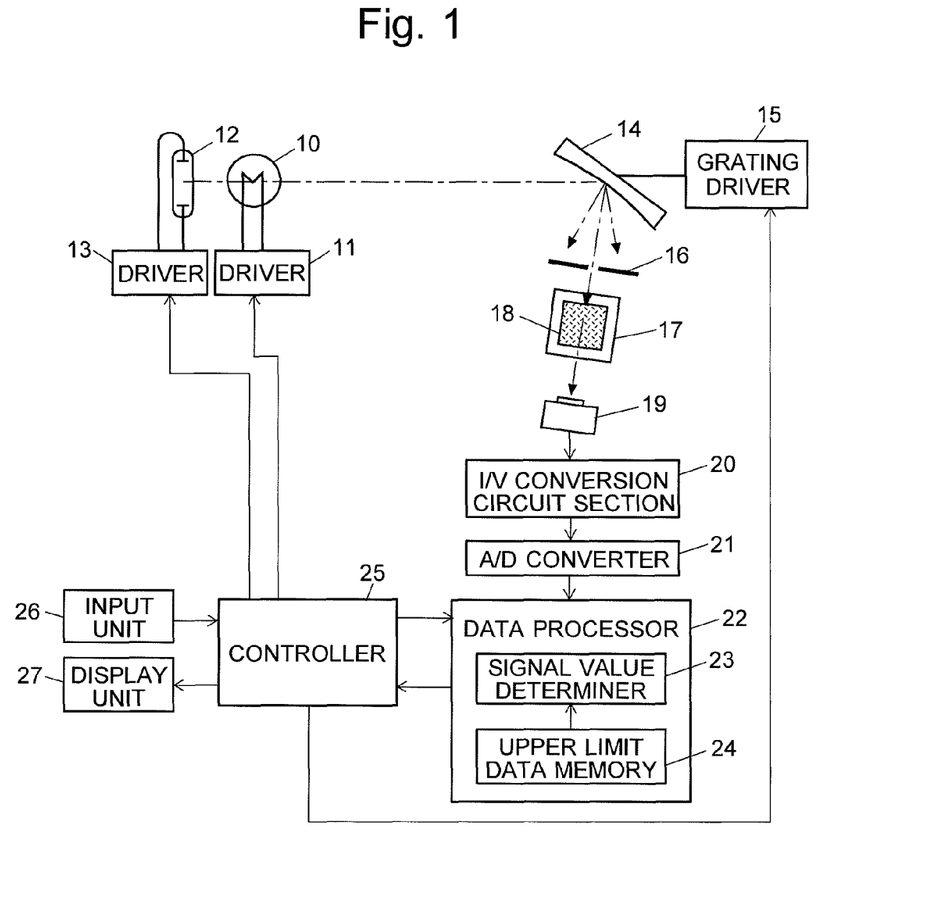
FIG. 1 is a configuration diagram of the main portions of an absorption spectrophotometer according to an embodiment of the present invention.
Figure 2:
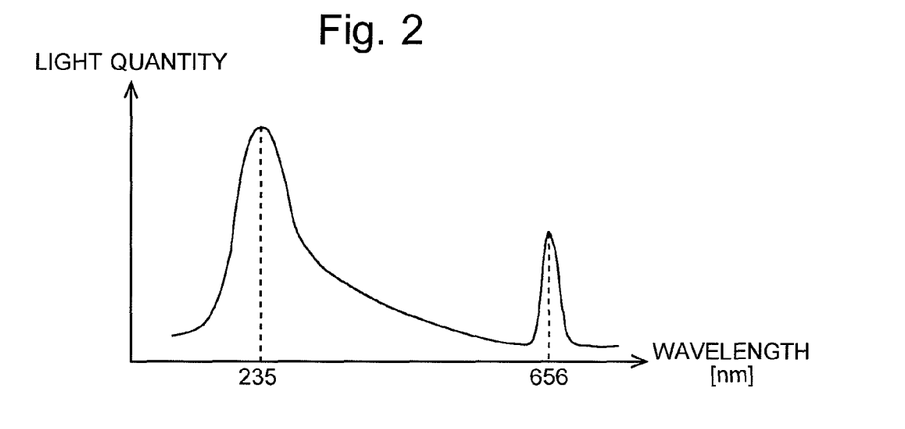
FIG. 2 is a graph schematically showing an emission spectrum of a deuterium lamp.
Figure 3:
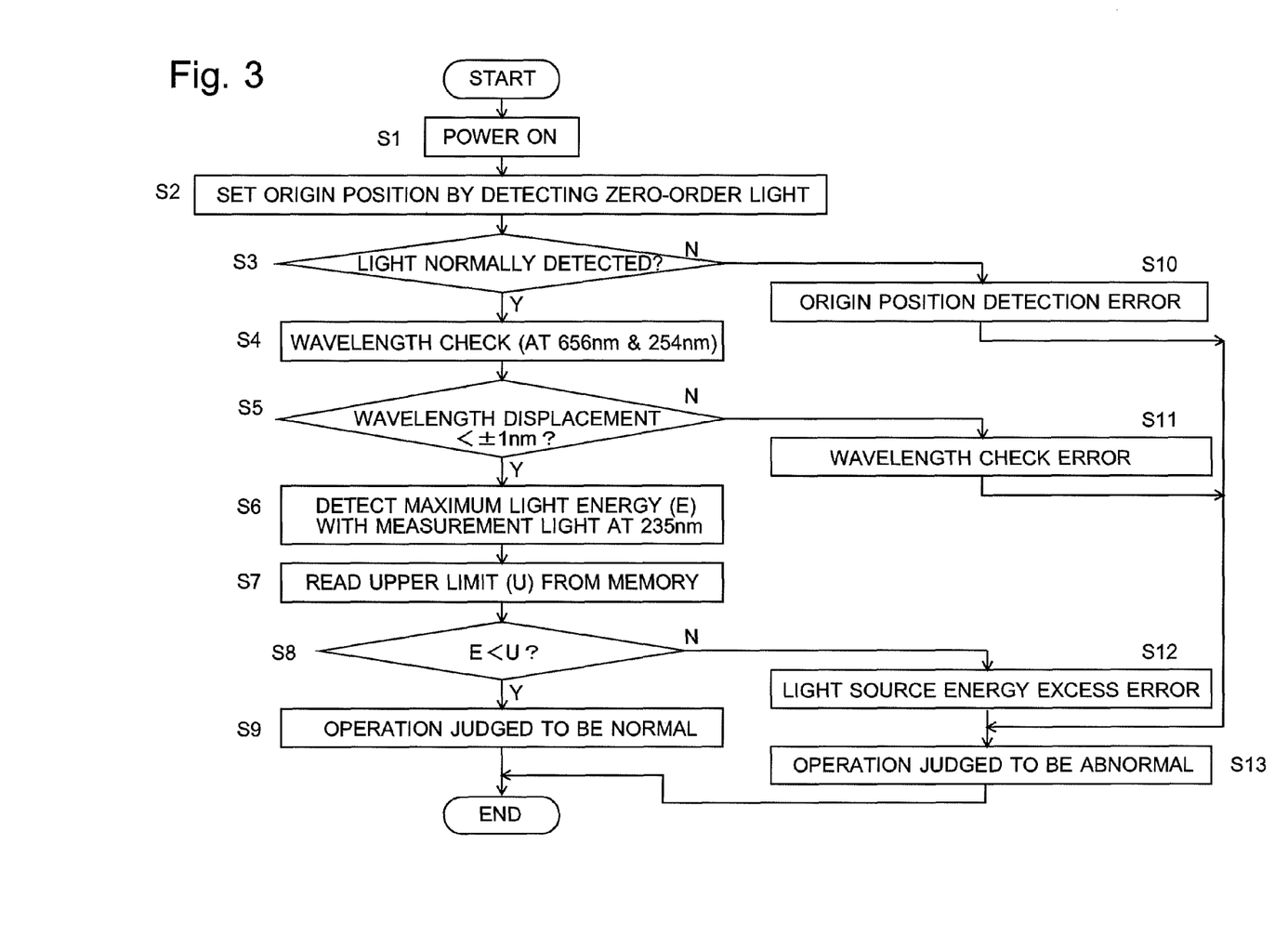
FIG. 3 is a flowchart for illustrating an operation characteristic of the absorption spectrophotometer in the present embodiment.

An absorption spectrophotometer, which is the first embodiment of the spectrophotometer according to the present invention, is hereinafter described with reference to FIGS. 1 to 3. FIG. 1 is a configuration diagram of the main portions of the absorption spectrophotometer in the present embodiment. FIG. 2 is graph schematically showing an emission spectrum of a deuterium lamp. FIG. 3 is a flowchart for illustrating an operation characteristic of the absorption spectrophotometer in the present embodiment. In FIG. 1, the components identical to those already depicted in FIG. 7 are denoted by the same numerals, and the explanations of those components are omitted.

The light source includes a low-pressure mercury lamp 12 for a wavelength check, which is operated by a driver 13, in addition to a deuterium lamp 10 which is operated by another driver 11. The deuterium lamp 10 in this embodiment is a see-through type, which allows the two lamps 10 and 12 to be arranged on the same optical path. Alternatively, the low-pressure mercury lamp 12 may also be a see-through type. It is also possible to place the two lamps 10 and 12 on different optical paths and add a switching mechanism for selecting light emitted from the two lamps and sending the selected light into a shared optical path.

The controller 25, which includes a central processing unit (CPU) and other elements, generally controls various components of the apparatus; for example, it sends command signals to the driver 11 or 13 to turn on or off the lamp 10 or 12 or driving signals to the grating driver 15 to make a light component with a specific wavelength pass through the slit 16. Connected to the controller 25 are an input unit 26 including a keyboard and other devices to be operated by a user and a display unit 27 for showing measured results or presenting alarm information as will be described later. The data processor 22 includes an upper limit memory 24 and a signal value determiner 23, both characterizing the present embodiment. The memory 24 consists of an EEPROM or similar non-volatile memory capable of maintaining its contents even after the apparatus is powered off.

In the manufacturing stage (including a tuning stage) of the apparatus, the manufacturer determines an upper limit value as the threshold value and stores it in the upper limit memory 24 as follows.

The sample cell 17 is displaced from the apparatus so that the light that has passed through the slit 16 can directly reach (i.e. without undergoing absorption) the photodetector 19. In this state, when the operator performs a predetermined operation on the input unit 26, the controller 25 commands the grating driver 15 to orient the diffraction grating 14 so that a light component falling onto the photodetector 19 will have a wavelength of 235 nm, and also commands the driver 11 to turn on the deuterium lamp 10. As a result, a monochromatic light with wavelength 235 nm is extracted from the radiation from the deuterium lamp 10 and directed to the photodetector 19.

As shown in FIG. 2, the luminous energy of the deuterium lamp 10 is maximized at approximately the wavelength 235 nm. When the sample cell 17 is not present, the light undergoes no absorption, so that the light falling onto the photodetector 19 will have an excessive energy, causing the output of the I/V conversion circuit section 20 to saturate. For example, imagine that the output value of the A/D converter 21 in this state is a digital value equivalent to 3600 mV. This means that the upper limit of the output of the operational amplifier included in the I/V conversion circuit section 20 is 3600 mV. Based on that digital value, the data processor 22 determines an upper limit data U and stores it in the upper limit data memory 24. This upper limit is obtained by subtracting from the digital value a predetermined value inclusive of the variations in the characteristics of the relevant electrical parts and other margins, or multiplying the digital value by a predetermined marginal factor. For example, if the margin for subtraction is 10% and the output value of the A/D converter 21 is a digital value equivalent to 3600 mV, the upper limit data U will be a digital value equivalent to 3240 mV.

After the apparatus is delivered to a user, the apparatus automatically performs an operational abnormality checking process when, for example, the apparatus is energized or a validation check is performed.

For example, when the apparatus is powered on by a user operation (Step S1), the controller 25, receiving the power supply, initially sets the origin position (i.e. the reference position for the rotational motion of the diffraction grating 14) by detecting the zero-order light of the deuterium lamp 10 (Step S2). Specifically, the controller 25 commands the driver 11 to turn on only the deuterium lamp 10. Then, while controlling the grating driver 15 to gradually turn the diffraction grating 14, the controller 25 locates the rotational position (e.g. the step position of the drive motor) where the zero-order light is detected on the basis of the detection signal of the photodetector 19. The position thus located is stored in a memory. Next, in Step S3, it is checked whether the zero-order light has been correctly detected in Step S2. If the detection result has been found to be incorrect, an "origin position detection error" is shown on the display unit 27 (Step S10), and the process goes to Step S13.

If the zero-order light has been correctly detected, the next step is to check whether a wavelength displacement is present at the 656 nm line spectrum of the deuterium lamp 10 and the 254 nm line spectrum of the low-pressure mercury lamp 12, respectively (Step S4). Specifically, the controller 25 turns on only the deuterium lamp 10 through the driver 11. Then, while operating the drive motor of the grating driver 15 with the previously located origin position as the reference position, the controller 25 monitors the detection signal of the photodetector 19 to locate the step position of the drive motor where the 656 nm line spectrum is observed. Then, a wavelength displacement is calculated by comparing the measured position of the 656 nm line spectrum with a theoretical position of the 656 nm line spectrum. The theoretical position is derived from a predetermined equation that relates the step numbers of the drive motor to the wavelength values.

Similarly, the controller 25 turns on only the low-pressure mercury lamp 12 through the driver 13. Then, while operating the drive motor of the grating driver 15 with the previously located origin position as the reference position, the controller 25 monitors the detection signal of the photodetector 19 to locate the step position of the drive motor where the 254 nm line spectrum is observed. Then, a wavelength displacement is calculated by comparing the measured position of the 254 nm line spectrum with a theoretical position of the 254 nm line spectrum to calculate the wavelength displacement. The theoretical position is derived from the equation that relates the step numbers of the drive motor to the wavelength values.

Subsequently, it is determined whether each of the two wavelength displacements is within a predetermined allowable range, e.g. ±1 nm (Step S5). If the wavelength displacement is within this allowable range, the wavelength check is judged to have been successful. It is assumed in this embodiment that a successful wavelength check guarantees there is no wavelength displacement over the entire wavelength range to be measured, including the wavelength 235 nm where the luminous energy of the deuterium lamp 10 is maximized. If the wavelength check has been unsuccessful, a "wavelength check error" is shown on the display unit 27 (Step S11), and the process goes to Step S13.

If the wavelength check in Steps S4 and S5 has been successful, only the deuterium lamp 10 is turned on through the driver 11, and the grating driver 15 is controlled so that the light passing through the slit 16 and falling onto the sample cell 17 will have a wavelength of 235 nm. In this state, the data processor 22 acquires data based on the detection signals produced by the photodetector 19; this data corresponds to the maximum value E of the luminous energy (Step S6). However, the wavelength that gives the maximum value E may be slightly displaced from 235 nm. Accordingly, it is preferable to scan the wavelengths of the light falling onto the sample cell 17 over a predetermined narrow range in the vicinity of the wavelength 235 nm (e.g. ±1 nm) to locate the wavelength where the luminous energy is maximized. It should be noted that at this stage the light undergoes no absorption by the sample solution 18 because the sample cell 17 is empty.

In the data processor 22, the signal value determiner 23 reads out the upper limit data U from the upper limit data memory 24 (Step S7) and determines whether the maximum value E is less than the upper limit data U (Step S8). If the maximum value E is not less than the upper limit data U, it means that an excessive quantity of the light is falling onto the photodetector 19, so that the signal may saturate. Accordingly, if the maximum value E is not less than the upper limit data U, a "light source energy excess error" is shown on the display unit 27 (Step S12), and the process goes to Step S13. Conversely, if the maximum value E is less than the upper limit data U, the signal will not saturate. Accordingly, the apparatus operation is judged to be normal (Step S9), and the operational abnormality checking process is completed to initiate a subsequent process.

If either the "origin position detection error", "wavelength check error", or "light source energy excess error" has been displayed in Step S10, S11 or S12, the apparatus operation is judged to be abnormal (Step S13) and the operational abnormality checking process is completed. In general, if both the deuterium lamp 10 and the diffraction grating 14 have been intact (i.e. not replaced) since the purchase of the apparatus, the maximum value E will be less than the upper limit data U, so that the apparatus operation will be judged to be normal. By contrast, if the deuterium lamp 10 has been replaced, the amount of the light emission may have been greatly increased. Similarly, if the diffraction grating 14 has been replaced, the diffraction efficiency may have been significantly enhanced. Such a part replacement can result in a maximum value E being equal to or greater than the upper limit data U. In this case, the data obtained without absorption by the sample solution 18 will be unreliable, so that the absorbance will not be correctly calculated. The "light source energy excess error" message helps the user to avoid such a wasteful measurement.

The operational abnormality checking process may be performed not only when the apparatus is energized, but also when a validation check for examining the apparatus operation is performed. It is also possible to perform the same checking at some other timing, e.g. when a predetermined operation has been performed on the input unit 26.

Figure 4:
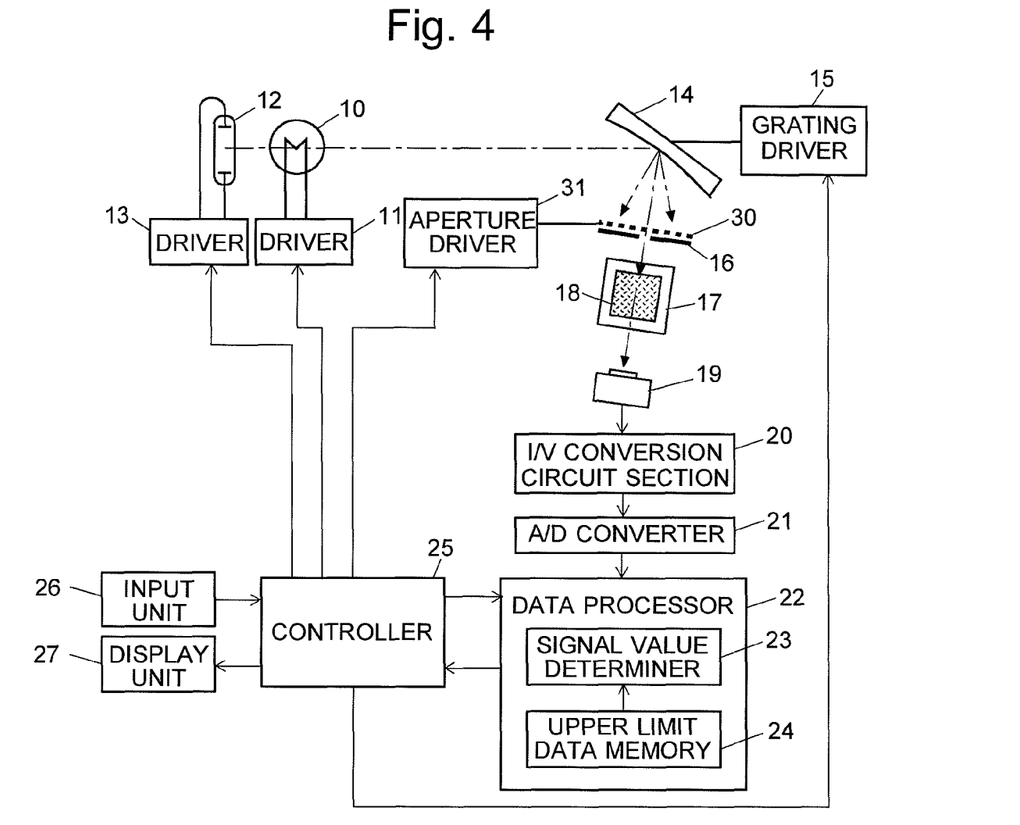
FIG. 4 is a configuration diagram of the main portions of an absorption spectrophotometer according to another embodiment of the present invention.
Figure 5:
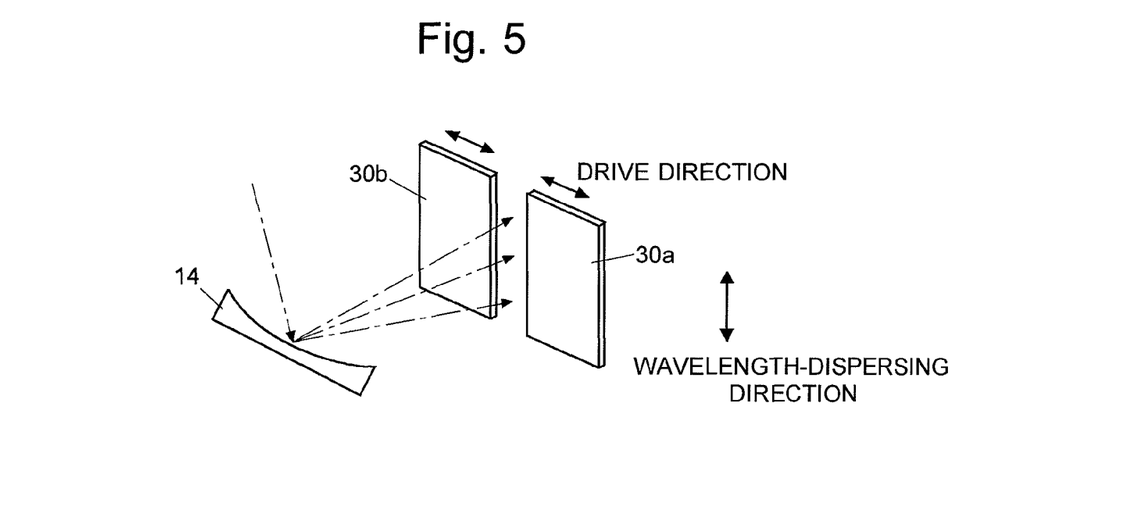
FIG. 5 is a schematic perspective view of an aperture for regulating the quantity of light.
Figure 6:
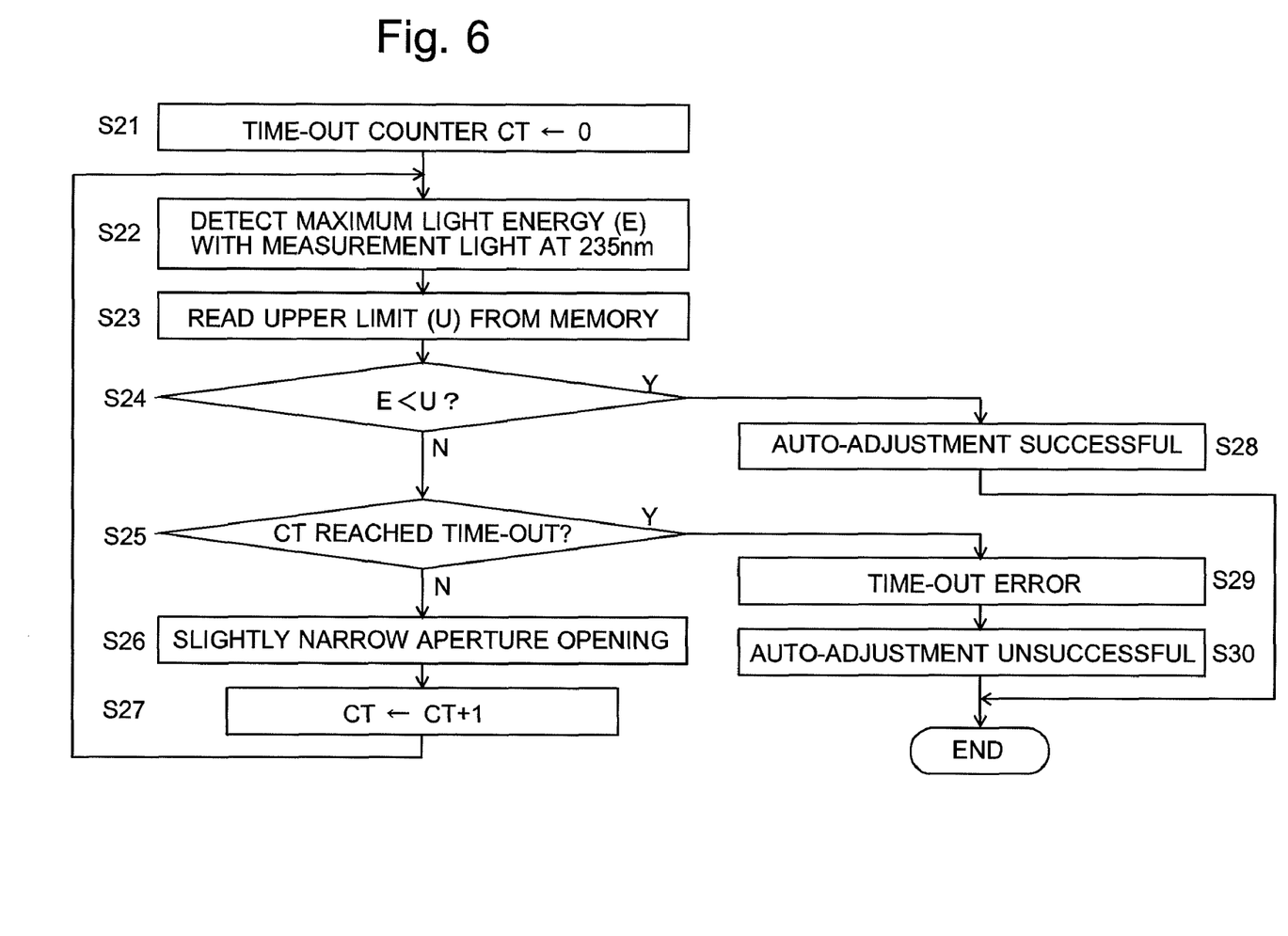
FIG. 6 is a flowchart for illustrating an operation characteristic of the absorption spectrophotometer in the present embodiment.

Another absorption spectrometer, which is the second embodiment of the spectrophotometer according to the present invention, is hereinafter described with reference to FIGS. 4 to 6. FIG. 4 is a configuration diagram of the main portions of the absorption spectrophotometer in the present embodiment. FIG. 5 is a schematic perspective view of an aperture for regulating the quantity of light. FIG. 6 is a flowchart for illustrating an operation characteristic of the absorption spectrophotometer in the present embodiment. In FIG. 4, the components identical to those already depicted in FIG. 1 or 7 are denoted by the same numerals, and the explanations of those components are omitted.

In the present embodiment, an adjustable aperture 30 for reducing the quantity of light is provided on the optical path between the diffraction grating 14 and the slit 16. As shown in FIG. 5, the adjustable aperture 30 includes two aperture plates 30a and 30b that can move in the direction perpendicular to the wavelength-dispersing direction of the diffraction grating 14. Reduction in the light quantity can be achieved by moving the aperture plates 30a and 30b closer to each other through an aperture driver 31 including a motor. The controller 25 has the function of controlling the operation of the aperture driver 31 in response to a judgment result fed from the signal value determiner 23 of the data processor 22.

The structure of the adjustable aperture 30 is not limited to the previous one; it has many variations. The adjustable aperture 30 may be located at any position on the optical path between the deuterium lamp 10 and the photodetector 19. As an alternative to the structure including a mechanically movable light-blocking member for blocking a portion of the light, a different light-quantity reduction method may be used, such as inserting an attenuation filter on the optical path.

An automatic adjustment process, which characterizes the spectrophotometer according to the present invention, is hereinafter described with reference to FIG. 6. This process is performed when, for example, the apparatus is energized or a validation check is performed. For example, when the apparatus is energized, the processes from Steps S1 through S5 in the first embodiment are initially performed; then, if the judgment result in Step S5 is "Yes", the process goes to Step S21 in FIG. 6. In Step S21, the data processor 22 resets a time-out counter CT to zero. Subsequently, the processes of Steps S22 through S24, which are identical to Steps S6 through S8, are performed.

If it is determined that the maximum value E is not less than the upper limit U in Step S24, the process goes to Step S25 to determine whether the counter CT has reached a predetermined time-out value. If the counter CT has not reached the time-out value, the controller 25 operates the aperture driver 31 to narrow the opening of the adjustable aperture 30 by a predetermined step width (Step S26). This operation reduces the quantity of the light falling onto the sample cell 17, causing a decrease in the detection signal produced by the photodetector 19. Subsequently, the counter CT is incremented by one (Step S27), and the process returns to Step S22.

Thus, while the value of the counter CT is less than the time-out value, the opening of the adjustable aperture 30 is gradually narrowed until the maximum value E becomes less than the upper limit U. At the point in time where the maximum value E has become less than the upper limit U, the process goes from Step S25 to Step 28 to conclude that the automatic adjustment has been successful, and the process is completed. On the other hand, if the counter CT has reached the time-out value before the maximum value E becomes less than the upper limit U, the process goes from Step S25 to Step 29, where a "time-out error" is shown on the display unit 27, with the conclusion that the automatic adjustment has been unsuccessful (Step S29), and the process is completed.

Thus, the spectrometer in the second embodiment does not immediately show the error message even if the light quantity is judged to be so excessive as to cause signal saturation; rather, it automatically decreases the light quantity, attempting to reach a level where the measurement without absorption by the sample solution 18 can be correctly performed. There is no need to call a service representative as long as the increase in the light quantity is due to a normal maintenance task, such as the replacement of the deuterium lamp 10 or diffraction grating 14. By contrast, if the "time-out error" is displayed, the failure is most likely an actual one. Accordingly, the user can take appropriate measures, such as calling a service representative.

An alternative to the previous method, in which the signal saturation is avoided by reducing the quantity of the light falling onto the photodetector 19, is to electrically attenuate the signal. Specifically, it is possible to provide a variable attenuator between the photodetector 19 and the I/V conversion circuit section 20 or use an I/V conversion circuit section 20 having a variable gain. Although these methods are ineffective in preventing signal saturation that may arise in the photoelectric conversion process of the photodetector 19 due to the incidence of an excessive quantity of light onto the photodetector 19, they are sufficiently effective in avoiding the saturation of the signal in the I/V conversion circuit section 20 or A/D converter 21.

It should be noted that any of the previous embodiments is a mere example of the present invention. Any changes, modifications or additions that are appropriately made within the spirit of the present invention will naturally be covered by the claims of this patent application.

What is claimed is:

1. A spectrophotometer including a light source for irradiating a sample with measurement light, a photodetector detecting light resulting from the sample being irradiated with the measurement light, a dispersing element located on an optical path between the light source and the sample or between the sample and the photodetector, and a processor dealing with a signal produced by the photodetector, comprising:
    a memory section used for storing a threshold value previously determined on a basis of an upper limit of a signal level that is processed by the processor;
    a signal acquirer detecting, with the light source turned on, a value of either a detection signal produced by the photodetector or a signal fed to the processor at a wavelength where a signal intensity is maximized during a power-on process or validation check of the spectrophotometer; and
    an abnormality detector comparing the signal value acquired by the signal acquirer with the threshold value stored in the memory section and then determining that an operation is abnormal if the signal value exceeds the threshold value.

2. The spectrophotometer according to claim 1, further comprising an alarm system informing a user of an abnormality when the abnormality detector has determined that the operation is abnormal.

3. The spectrophotometer according to claim 1, further comprising a light-quantity regulator, located on the optical path from the light source to the photodetector, for reducing a quantity of light and a controller controlling the light-quantity regulator so that the aforementioned signal value will be equal to or less than the threshold value if the abnormality detector has determined that the operation is abnormal.

4. The spectrophotometer according to claim 3, wherein the light-quantity regulator comprises a mechanically movable light-blocking member for blocking a portion of the light.

5. The spectrophotometer according to claim 3, further comprising:
    a counter holding a value indicating the number of control actions performed on the light-quantity regulator by the controller; and
    an alarm system informing a user of an abnormality when the value held by the counter has reached a predetermined value,
    wherein:
    while the value held by the counter is less than the predetermined value, the controller repeats the control action if the abnormality detector determines that the operation is abnormal.

6. The spectrophotometer according to claim 1, further comprising a signal attenuator, located between the photodetector and the processor, for attenuating signals and a controller controlling the signal attenuator so that the signal value fed to the processor will be equal to or less than the threshold value if the abnormality detector has determined that the operation is abnormal.

7. The spectrophotometer according to claim 1, wherein:
    the processor comprises a current/voltage conversion circuit converting an electric current produced by the photodetector into a voltage signal and an A/D converter converting the voltage signal into a digital value; and
    the upper limit of the signal level that can be processed by the processor equals either an upper limit of an output of an operational amplifier in the current/voltage conversion circuit or an upper limit of an input of the A/D converter.

8. The spectrophotometer according to claim 1, further comprising a wavelength locator for locating the wavelength where the signal intensity is maximized, by scanning a predetermined wavelength range in a vicinity of the wavelength where the signal intensity is maximized.

* * * * *